(12) United States Patent
Fukaya et al.

(10) Patent No.: US 11,062,174 B2
(45) Date of Patent: Jul. 13, 2021

(54) MOBILE ENTITY DETECTION APPARATUS, MOBILE ENTITY DETECTION METHOD, AND COMPUTER-READABLE RECORDING MEDIUM

(71) Applicant: NEC Solution Innovators, Ltd., Tokyo (JP)

(72) Inventors: Yasutoshi Fukaya, Tokyo (JP); Shohei Ono, Tokyo (JP); Masateru Mori, Tokyo (JP); Erina Kitahara, Tokyo (JP); Yuji Kurita, Tokyo (JP); Tadashi Sekihara, Tokyo (JP); Hirohito Iwase, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 12 days.

(21) Appl. No.: 16/488,991

(22) PCT Filed: Feb. 22, 2018

(86) PCT No.: PCT/JP2018/006586
§ 371 (c)(1),
(2) Date: Aug. 27, 2019

(87) PCT Pub. No.: WO2018/159467
PCT Pub. Date: Sep. 7, 2018

(65) Prior Publication Data
US 2020/0065615 A1   Feb. 27, 2020

(30) Foreign Application Priority Data

Feb. 28, 2017   (JP) .............................. JP2017-037555

(51) Int. Cl.
*G06K 9/62*   (2006.01)
*G06T 7/246*   (2017.01)
(Continued)

(52) U.S. Cl.
CPC ....... *G06K 9/6219* (2013.01); *G06K 9/00825* (2013.01); *G06K 9/46* (2013.01);
(Continued)

(58) Field of Classification Search
None
See application file for complete search history.

(56) References Cited

U.S. PATENT DOCUMENTS 8,290,209 B2   10/2012   Akita et al.
9,824,586 B2   11/2017   Sato et al.
(Continued)

FOREIGN PATENT DOCUMENTS

EP   1944721 A2   7/2008
JP   6-130076 A   5/1994
(Continued)

OTHER PUBLICATIONS

Written Opinion in International Application No. PCT/JP2018/006586, dated Apr. 24, 2018.
(Continued)

*Primary Examiner* — Mohammed Rachedine

(57) ABSTRACT

A mobile entity detection apparatus 10 includes: a feature point extraction unit 11 configured to extract, from image data output by an imaging device of a vehicle, a feature point moving in an image; an optical flow specification unit 12 configured to compare the latest image data with image data that was output in the past, and specify an optical flow for each feature point; a clustering unit 13 configured to perform clustering on the optical flow based on the optical flow and the position of the optical flow in the image, and separate the optical flow into a cluster; a filtering unit 14 configured to remove a cluster that corresponds to an object forming a background from among the clusters based on the traveling direction and speed of the vehicle; and a mobile entity
(Continued)

specification unit 15 configured to specify a mobile entity in the image using a result of clustering after cluster removal.

14 Claims, 8 Drawing Sheets

(51) Int. Cl.
    *G06K 9/00*             (2006.01)
    *G06K 9/46*             (2006.01)
    *G06T 7/215*           (2017.01)

(52) U.S. Cl.
    CPC .............. *G06K 9/623* (2013.01); *G06T 7/246* (2017.01); *G06K 2209/23* (2013.01); *G06T 2207/10016* (2013.01); *G06T 2207/30241* (2013.01); *G06T 2207/30252* (2013.01)

(56) References Cited

U.S. PATENT DOCUMENTS

| | | | | |
|---|---|---|---|---|
| 2017/0169554 A1* | 6/2017 | Karlinsky | .............. | G06K 9/621 |
| 2017/0249732 A1* | 8/2017 | Shankar | ................ | G06T 7/0004 |
| 2018/0101944 A1* | 4/2018 | Sakai | ................... | G01N 29/265 |
| 2018/0182067 A1* | 6/2018 | Liu | ....................... | G06T 3/4069 |
| 2018/0293721 A1* | 10/2018 | Gupta | .............. | G05B 19/41875 |
| 2020/0226742 A1* | 7/2020 | Sawlani | ............ | H01L 21/67288 |
| 2020/0226744 A1* | 7/2020 | Cohen | ....................... | G06T 7/11 |

FOREIGN PATENT DOCUMENTS

| | | |
|---|---|---|
| JP | H06-282655 A | 10/1994 |
| JP | 2003-346159 A | 12/2003 |
| JP | 2008-97126 A | 4/2008 |
| JP | 2011-43922 A | 3/2011 |
| JP | 2012-3663 A | 1/2012 |
| JP | 2013-003110 A | 1/2013 |
| JP | 2014-29604 A | 2/2014 |
| JP | 2016-126662 A | 7/2016 |

OTHER PUBLICATIONS

International Search Report on International Application No. PCT/JP2018/006586, dated Apr. 24, 2018.
Masahiro Kiyohara et al., "Development on moving-object detection technique for monitoring periphery of vehicle", Eizojoho Industrial, May 1, 2012, vol. 44, No. 5, p. 45-51 (7 pages total).
Extended European Search Report for EP Application No. EP18761193.4 dated Oct. 23, 2020.

* cited by examiner

CLUSTERING BASED ON DISTANCE BETWEEN
OPTICAL FLOWS

GENERATE NEW CLUSTERING

MOBILE ENTITY DETECTION APPARATUS, MOBILE ENTITY DETECTION METHOD, AND COMPUTER-READABLE RECORDING MEDIUM

This application is a National Stage Entry of PCT/JP2018/006586 filed on Feb. 22, 2018, which claims priority from Japanese Patent Application 2017-037555 filed on Feb. 28, 2017, the contents of all of which are incorporated herein by reference, in their entirety.

TECHNICAL FIELD

The present invention relates to a mobile entity detection apparatus and a mobile entity detection method for detecting a mobile entity from an image captured with an imaging device, and further relates to a computer-readable recording medium where a program for realizing these is recorded.

BACKGROUND ART

In recent years, in order to improve the safety of a vehicle and its surroundings, technology has been proposed in which a mobile entity at the periphery of the vehicle is detected based on image data from a camera attached to the vehicle, and a driver is notified of the approach of the mobile entity. (See, for example, Patent Documents 1 and 2).

Specifically, Patent Documents 1 and 2 both disclose a mobile entity detection apparatus to be mounted in a vehicle. The mobile entity detection apparatus disclosed in Patent Documents 1 and 2 first extracts feature points from respective images successively output at a set interval from a camera, then compares the extracted feature points between images, and generates an optical flow that links the feature points.

Next, the mobile entity detection apparatus disclosed in Patent Document 1 selects an optical flow that satisfies setting conditions. There are two setting conditions at this time, with one condition being that an extension line of the optical flow intersects at one vanishing point with a predetermined error range. The other condition is that in the extension line of the optical flow, with one end point of the optical flow serving as an external division point, an external division ratio of a line that links the other end point of the optical flow with the vanishing point is equal within the predetermined error range. Also, the mobile entity detection apparatus disclosed in Patent Document 1 detects a mobile entity from a selected optical flow.

According to the mobile entity detection apparatuses disclosed in Patent Documents 1 and 2, a mobile entity at the periphery of a vehicle can be detected, so for example, if a configuration is adopted in which a mobile entity is detected based on an image from a rear camera that captures images rearward from the vehicle, the driver can recognize a vehicle positioned to the rear.

LIST OF RELATED ART DOCUMENTS

Patent Documents

Patent Document 1: Japanese Patent Laid-Open Publication No. 2008-97126

Patent Document 2: Japanese Patent Laid-Open Publication No. 2011-43922

SUMMARY OF INVENTION

Problems to be Solved by the Invention

However, in the mobile entity detection apparatuses disclosed in above Patent Documents 1 and 2, the mobile entity is detected by selecting an optical flow that intersects at one vanishing point. Therefore, with the mobile entity detection apparatuses disclosed in above Patent Documents 1 and 2, since an object forming part of a background, for example, such as road markings, a parked vehicle, or a signboard, moves relative to the vehicle, it is possible that such an object will be falsely detected.

An example object of the present invention is to provide a mobile entity detection apparatus, a mobile entity detection method, and a computer-readable recording medium that address the above-described problem, and are capable of improving the accuracy of mobile entity detection by distinguishing between a mobile entity and an object forming part of a background.

Means for Solving the Problems

In order to achieve the example object described above, a mobile entity detection apparatus according to an example aspect of the present invention is an apparatus for detecting a mobile entity from image data output by an imaging device installed in a vehicle, the detection apparatus including:

a feature point extraction unit configured to extract, from image data successively output at a set interval by the imaging device, a feature point moving in an image;

an optical flow specification unit configured to compare the latest image data with image data that was output further in the past, and specify an optical flow for each feature point extracted;

a clustering unit configured to perform clustering on the optical flow based on the specified optical flow and the position of the specified optical flow in the image, and separate the optical flow into a cluster;

a filtering unit configured to remove a cluster that corresponds to an object forming a background from among clusters obtained by clustering, based on the traveling direction and speed of the vehicle; and a mobile entity specification unit configured to specify a mobile entity in the image using a result of clustering after cluster removal by the filtering unit.

Also, in order to achieve the example object described above, a mobile entity detection method according to an example aspect of the present invention is a method for detecting a mobile entity from image data output by an imaging device installed in a vehicle, the method including:

(a) a step of extracting, from the image data successively output at a set interval by the imaging device, a feature point moving in an image;

(b) a step of comparing the latest image data with image data that was output further in the past, and specifying an optical flow for each feature point extracted;

(c) a step of performing clustering on the optical flow based on the specified optical flow and the position of the specified optical flow in the image, and separating the optical flow into a cluster;

(d) a step of removing a cluster that corresponds to an object forming a background from among clusters obtained by clustering, based on the traveling direction and speed of the vehicle; and (e) a step of specifying a mobile entity in the image using a result of clustering after cluster removal by the (d) step.

Furthermore, in order to achieve the example object described above, a computer-readable recording medium according to an example aspect of the present invention includes a program recorded thereon for, with a computer, detecting a mobile entity from image data output by an imaging device installed in a vehicle, the program including instructions that cause the computer to carry out:

(a) a step of extracting, from image data successively output at a set interval by the imaging device, a feature point moving in an image;

(b) a step of comparing the latest image data with image data that was output further in the past, and specifying an optical flow for each feature point extracted;

(c) a step of performing clustering on the optical flow based on the specified optical flow and the position of the specified optical flow in the image, and separating the optical flow into a cluster;

(d) a step of removing a cluster that corresponds to an object forming a background from among clusters obtained by clustering, based on the traveling direction and speed of the vehicle; and (e) a step of specifying a mobile entity in the image using a result of clustering after cluster removal by the (d) step.

Advantageous Effects of the Invention

As described above, according to the present invention, it is possible to improve the accuracy of mobile entity detection by distinguishing between a mobile entity and an object forming part of a background.

EXAMPLE EMBODIMENT

Example Embodiment

Following is a description of a mobile entity detection apparatus, a mobile entity detection method, and a program according to an example embodiment of the present invention, with reference to FIGS. 1 to 8.

[Device Configuration]

Figure 1:
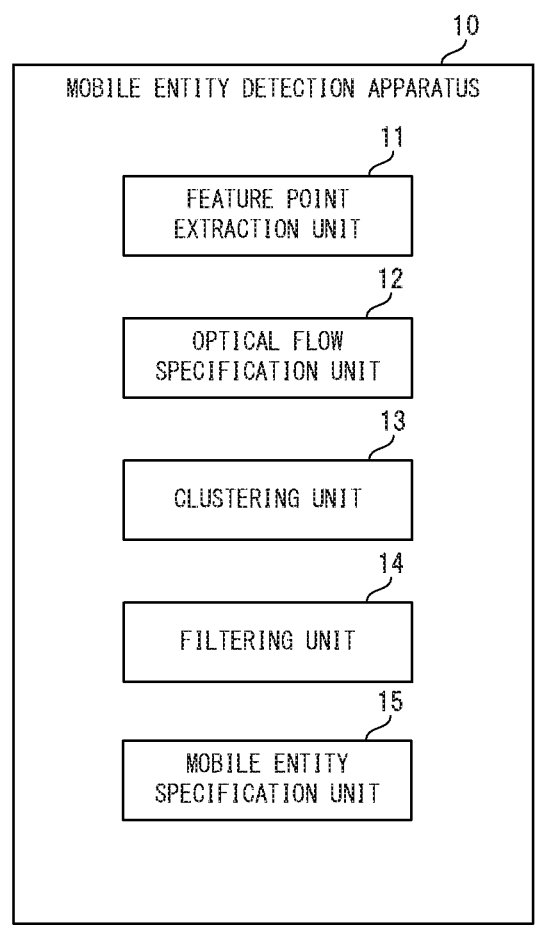
FIG. 1 is a block diagram showing a schematic configuration of a mobile entity detection apparatus according to an example embodiment of the present invention.

First, the schematic configuration and functions of a mobile entity detection apparatus according to this example embodiment will be described with reference to FIG. 1. FIG. 1 is a block diagram showing the schematic configuration of the mobile entity detection apparatus according to this example embodiment of the present invention.

A mobile entity detection apparatus 10 in this example embodiment, shown in FIG. 1, is an apparatus for detecting a mobile entity from image data output by an imaging device installed in a vehicle. As shown in FIG. 1, the mobile entity detection apparatus 10 includes a feature point extraction unit 11, an optical flow specification unit 12, a clustering unit 13, a filtering unit 14, and a mobile entity specification unit 15.

The feature point extraction unit 11 extracts, from image data successively output at a set interval by the imaging device, a feature point moving in an image. The optical flow specification unit 12 compares the latest image data with image data that was output further in the past, and specify an optical flow for each feature point extracted.

The clustering unit 13 performs clustering on all of the obtained optical flows based on the specified optical flows and the position of the specified optical flows in the image, and separate each optical flow into a cluster. The filtering unit 14 removes a cluster that corresponds to an object forming a background from among clusters obtained by clustering, based on the traveling direction and speed of the vehicle. The mobile entity specification unit 15 specifies a mobile entity in the image using a result of clustering after cluster removal by the filtering unit 14.

In this way, in this example embodiment, the mobile entity detection apparatus 10 detects a mobile entity by clustering optical flows of feature points, and removing a cluster that corresponds to a background from the obtained clusters. Therefore, according to this example embodiment, it is possible to improve the accuracy of mobile entity detection by distinguishing between a mobile entity and an object forming a background.

Figure 2:
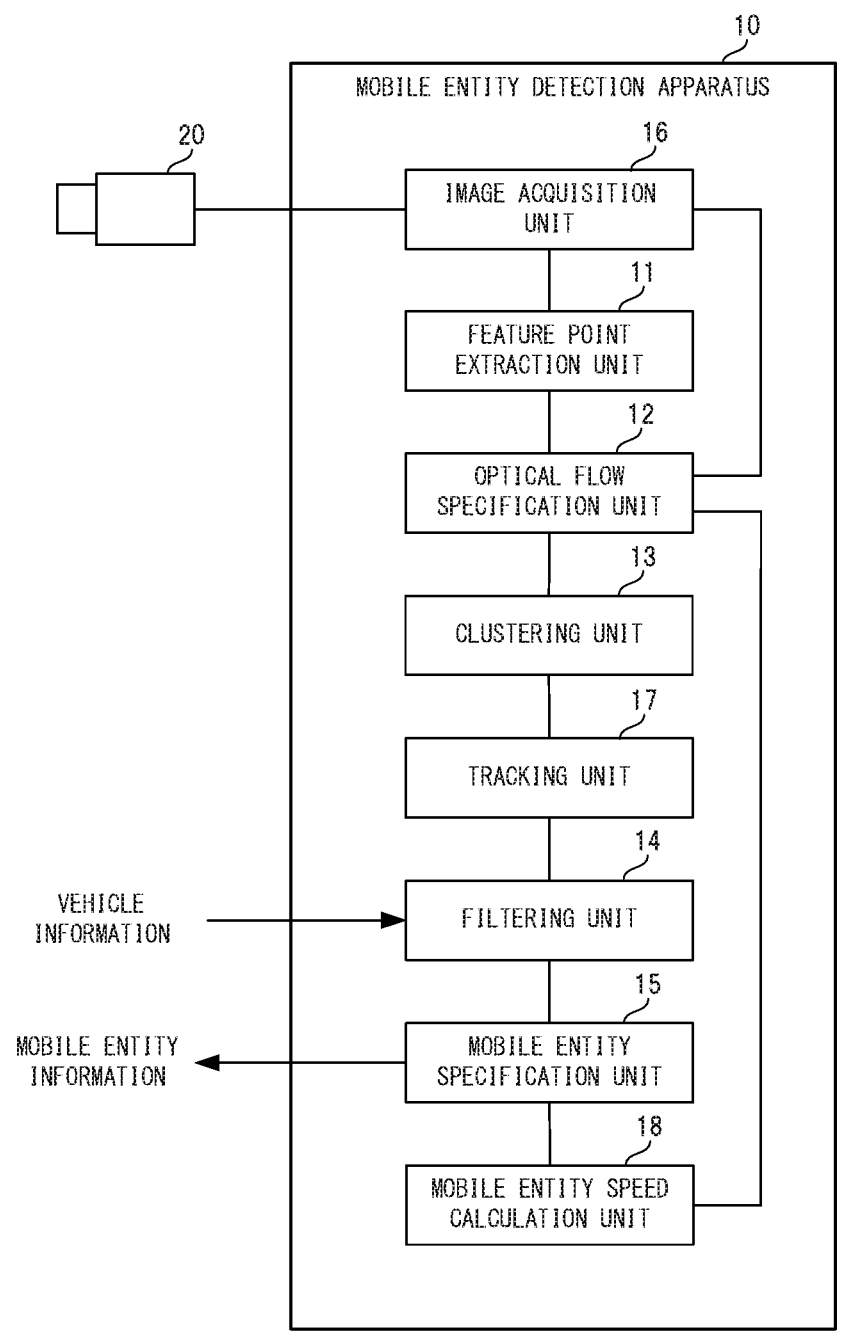
FIG. 2 is a block diagram showing a specific configuration of the mobile entity detection apparatus according to an example embodiment of the present invention.

Next, the configuration of the mobile entity detection apparatus according to this example embodiment will be more specifically described with reference to FIG. 2. FIG. 2 is a block diagram showing the specific configuration of the mobile entity detection apparatus according to this example embodiment of the present invention.

As shown in FIG. 2, the mobile entity detection apparatus 10 in this example embodiment is connected to an external imaging device 20. The imaging device 20 includes a solid-state imaging sensor, and when performing imaging, outputs image data of a color image to the mobile entity detection apparatus 10. In this example embodiment, the imaging device 20 continuously outputs image data at a set time interval (frame rate).

Also, as shown in FIG. 2, in this example embodiment, the mobile entity detection apparatus 10 includes an image acquisition unit 16, a tracking unit 17, and a mobile entity speed calculation unit 18, in addition to the feature point extraction unit 11, the optical flow specification unit 12, the clustering unit 13, the filtering unit 14, and the mobile entity specification unit 15.

The image acquisition unit 16 acquires image data to be processed from the imaging device 20. Specifically, because image data of a color image is output from the imaging device 20, first, the image acquisition unit 16 performs image conversion on the image data that has been output to convert the color image into a grayscale image. Next, the image acquisition unit 16 executes distortion correction on the image data as necessary, and then inputs the corrected image data to the feature point extraction unit 11 and the optical flow specification unit 12. Note that distortion correction is performed, for example, when a shooting lens attached to the imaging device 20 is a fisheye lens or the like.

In this example embodiment, the feature point extraction unit 11 first calculates an unbiased variance of luminance change using image data for a predetermined number of frames (for example, 10 frames), and compares the calculated value with a threshold value to determine whether each pixel corresponds to a moving pixel or a stationary pixel. Then, the feature point extraction unit 11 sets an area in which a pixel determined to be a moving pixel exists as a movement area in which a mobile entity exists. Next, the feature point extraction unit 11 extracts feature points in the movement area of the image data of the current frame using, for example, an ordinary FAST algorithm.

Figure 3:
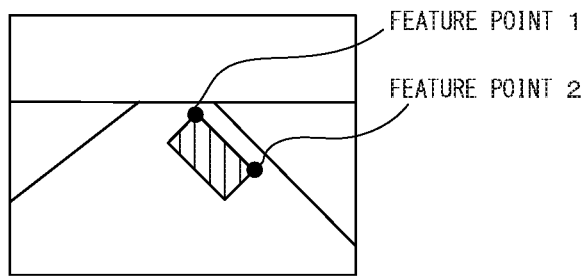
FIG. 3 illustrates processing to specify an optical flow of feature points according to an example embodiment of the present invention.
Figure 3:
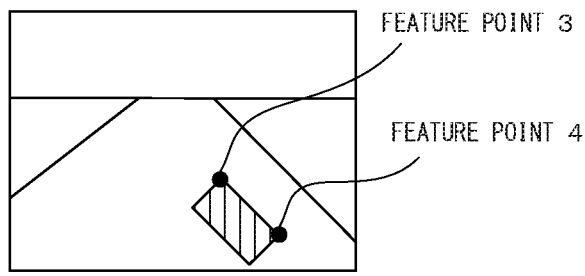
Figure 3:

In this example embodiment, for example, as shown in FIG. 3, the optical flow specification unit 12 first compares the feature points of a past frame that is one frame prior to the current frame with the feature points of the current frame, and links together feature points that correspond to each other. In the example of FIG. 3, the optical flow specification unit 12 links a feature point 1 of the past frame that is one frame prior to the current frame with a feature point 3 of the current frame, and links a feature point 2 of the past frame that is one frame prior to the current frame with a feature point 4 of the current frame. Then, the optical flow specification unit 12 connects the linked feature points together to specify an optical flow. FIG. 3 illustrates processing to specify an optical flow of feature points according to an example embodiment of the present invention.

Specifically, the optical flow specification unit 12 calculates the degree of similarity between feature points, and links feature points together whose calculated degree of similarity is at least a threshold value. The degree of similarity used in this case is, for example, a Hamming distance calculated from binary code generated by a Rotated Brief method.

The optical flow specification unit 12 can also specify an optical flow in a case where, in order to shorten the processing time, the image is divided, each area obtained by the division and the area at the periphery of that area is set as one group, and feature points are connected together for each group.

Furthermore, in this example embodiment, the optical flow specification unit 12 can acquire vehicle information from a vehicle (hereinafter referred to as the "host vehicle") where the mobile entity detection apparatus 10 is mounted, and can specify the traveling direction and the speed of the host vehicle. The vehicle information is information that specifies the state (forward or reverse), the turning angle, the speed, and the like of the host vehicle. In this case, the optical flow specification unit 12 removes an optical flow related to an object forming a background from among the specified optical flows based on the traveling direction and speed of the host vehicle.

Figure 4:
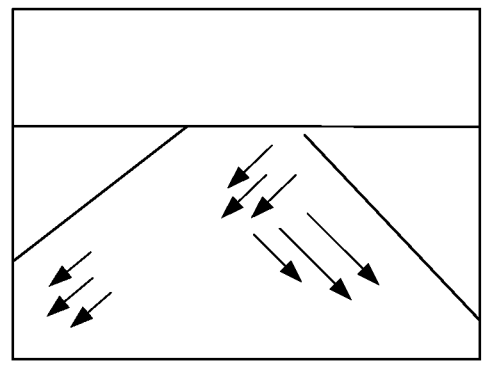
FIG. 4 illustrates processing to perform optical flow clustering according to an example embodiment of the present invention.
Figure 4:
Figure 4:
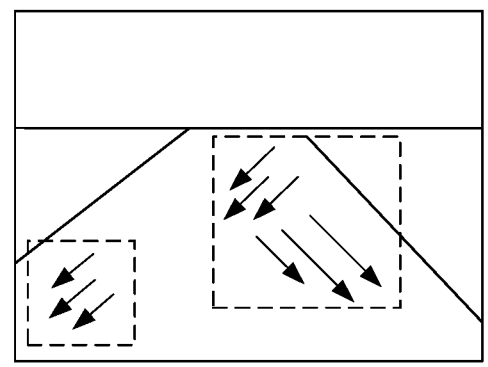
Figure 4:
Figure 4:
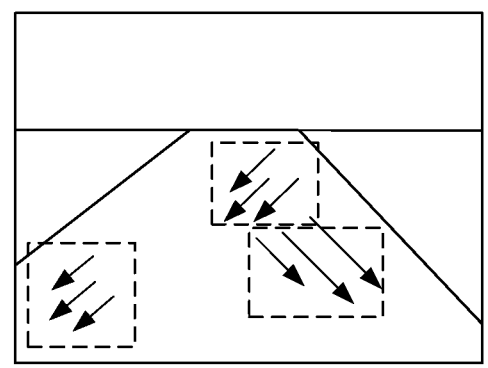

In this example embodiment, the clustering unit 13 executes clustering using an x-mean algorithm. For example, as shown in FIG. 4, the clustering unit 13 first specifies the distance between optical flows, and executes clustering based on the specified distance. FIG. 4 illustrates processing to perform optical flow clustering according to an example embodiment of the present invention.

Next, the clustering unit 13 specifies, for each cluster generated by the clustering, an optical flow whose length, position (coordinates in a screen), and direction deviate greatly from the average value of optical flows in that cluster. The specified optical flow is not considered to originate from the same mobile entity, so the clustering unit 13 removes the specified optical flow from the original cluster, and registers this optical flow in a newly generated cluster, as shown in FIG. 4.

Also, after executing clustering, in a case where, among a plurality of the clusters, the positional relationship between the plurality of clusters, and the length and direction of the respective optical flows of the clusters, satisfy set conditions, the clustering unit 13 combines these clusters as a single cluster. The reason for this is that the optical flows of these clusters can be considered to originate from the same mobile entity.

Specifically, the clustering unit 13 first specifies two clusters as combination candidates, based on a condition that the clusters overlap each other, and a condition that the average length and the direction of the optical flows in the clusters is similar between the clusters. Next, the clustering unit 13 compares the direction of the optical flows in a central area (for example, 20 pixels×20 pixels) when connecting the centers of the two clusters specified as combination candidates to each other, and the clustering unit 13 combines these combination candidates when the direction is the same for each cluster.

The tracking unit 17 determines, for each cluster obtained by clustering, whether or not the position of each cluster overlaps a position predicted from image data other than the latest image data. Specifically, the tracking unit 17 compares a cluster that is the determination target in the current frame with a cluster that is the determination target in a plurality of past frames (for example, the past 6 frames), and if the positions of these clusters match in at least a fixed number of past frames, the tracking unit 17 determines that the position of the cluster in the current frame overlaps the predicted position. Then, the tracking unit 17 notifies the filtering unit 14 of the clusters determined to overlap.

Also, the tracking unit 17 determines that there is overlapping not only in a case where the cluster in the current frame completely matches the cluster in the past frames, but also in a case where both clusters overlap by at least a fixed ratio. Furthermore, in order to prevent clusters corresponding to different mobile entities from being matched to each other, the tracking unit 17 also can reduce the area of the cluster that is the determination target (for example, ¼), and then perform the matching determination.

Furthermore, the tracking unit 17 can also calculate, as coordinates of the cluster that is the determination target, average coordinates of the coordinates of the cluster in the current frame and the coordinates of the matched cluster of the past frames, and use the calculated average coordinates as the coordinates of the cluster that is the determination target.

Also, in a case where the result of comparison of the cluster of the current frame with the cluster of a plurality of past frames is that the number of past frames that match is less than a threshold value, there is a high possibility of false detection, so the tracking unit 17 deletes the cluster that is the determination target. However, regarding the deleted cluster, in a case where it was determined that the cluster overlaps in the previous determination, the tracking unit 17 can also restore the deleted cluster.

In this example embodiment, the filtering unit 14 first acquires vehicle information from the host vehicle, and specifies the traveling direction and the speed of the host vehicle. The vehicle information is information that specifies the state (forward or reverse), the turning angle, the speed, and the like of the host vehicle.

Next, based on the specified traveling direction and speed of the host vehicle, from among the clusters for which notification was given from the tracking unit 17, the filtering unit 14 specifies clusters that correspond to an object forming a background, and removes the specified clusters.

Figure 5:
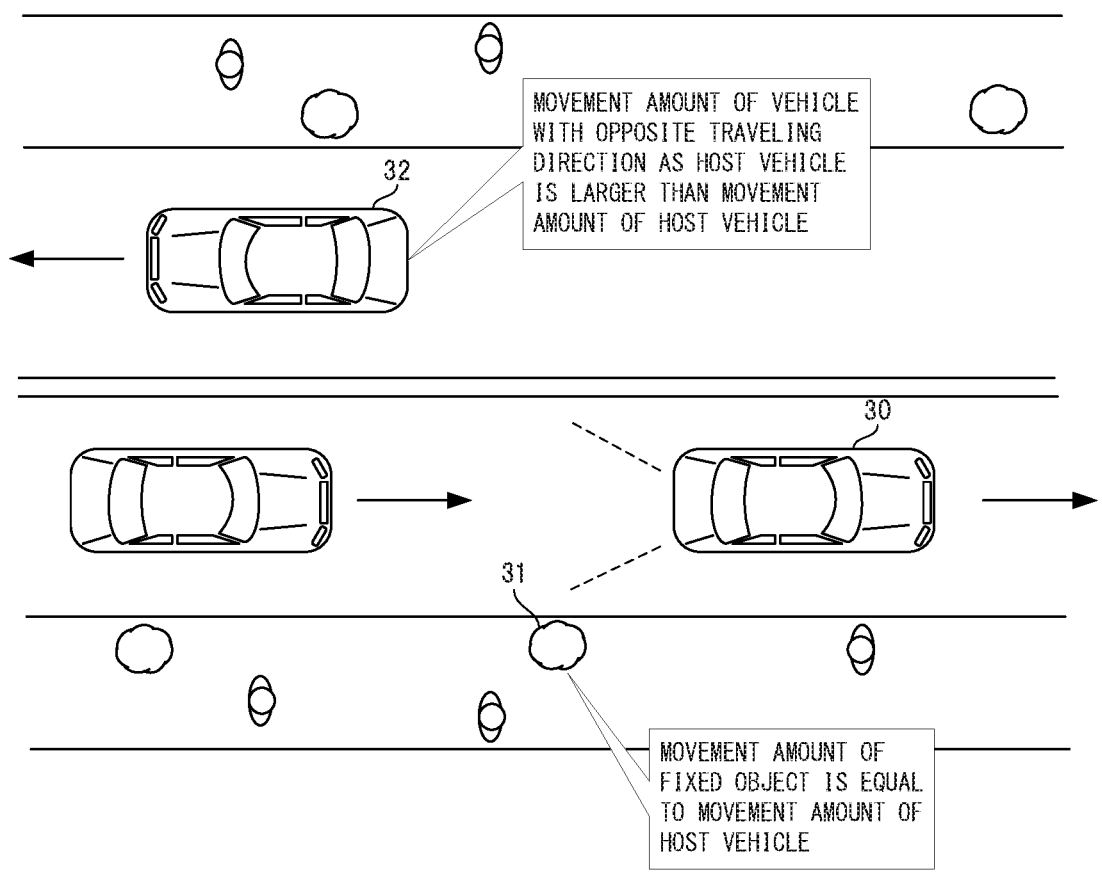
FIG. 5 illustrates processing to perform background removal according to an example embodiment of the present invention.

Specifically, as shown in FIG. 5, regarding an object (for example, a tree) 31 fixed to the ground, the movement direction of that object is opposite to the movement direction of a host vehicle 30, and the movement amount of the object 31 is equal to the movement amount of the host vehicle 30. Also, regarding a vehicle 32 traveling in the opposite direction as the host vehicle 30, the movement direction of the vehicle 32 is opposite to the movement direction of the host vehicle 30, and the movement amount of the vehicle 32 is larger than the host vehicle movement amount. FIG. 5 illustrates processing to perform background removal according to an example embodiment of the present invention. Note that in FIG. 5, the broken lines to the rear of the host vehicle 30 indicate an imaging range of the imaging device.

Therefore, among the optical flows included in the clusters for which notification was given, the filtering unit 14 first specifies optical flows whose movement direction is opposite to the movement direction of the host vehicle 30, and whose movement amount is at least as much as the movement amount of the host vehicle 30. Next, the filtering unit 14 specifies a cluster including a specified optical flow as a cluster that corresponds to an object forming a background, and removes the specified cluster.

In this example embodiment, the mobile entity specification unit 15 specifies a mobile entity based on a cluster other than the clusters that were removed by the tracking unit 17 and the filtering unit 14. Also, the mobile entity specification unit 15 gives notification of information of the specified mobile entity to the vehicle. Examples of the information given in this notification include the position in an image, the movement direction, the speed, and the like of the mobile entity. Note that the speed is calculated by the mobile entity calculation unit 18, described later.

The mobile entity speed calculation unit 18, using the direction and length of the optical flows regarding the mobile entity specified by the mobile entity specification unit 15, calculates the speed (relative speed) of the specified mobile entity with respect to the mobile entity detection apparatus 10 (the host vehicle).

Figure 6:
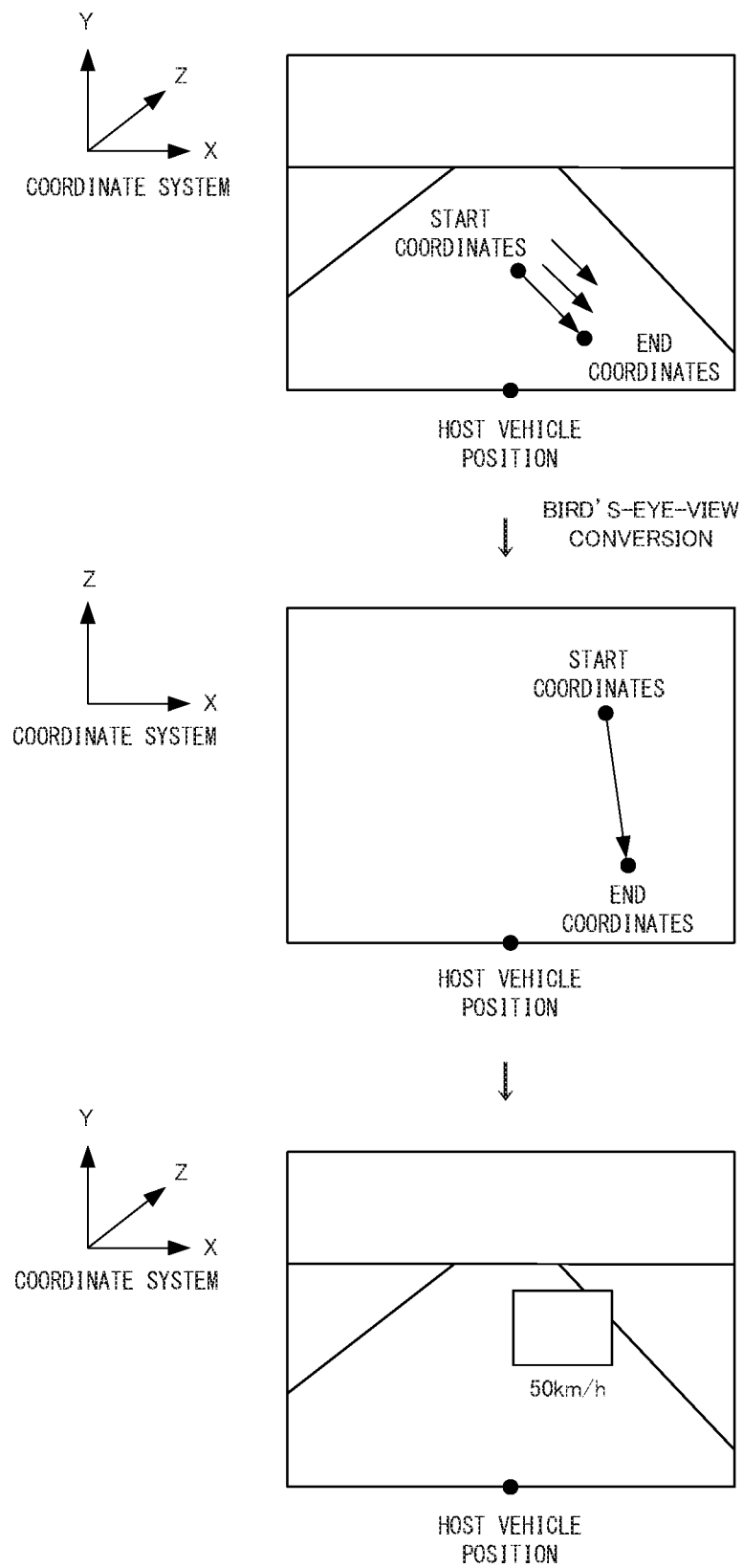
FIG. 6 illustrates processing to calculate the relative speed of a mobile entity according to an example embodiment of the present invention.

Specifically, as shown in FIG. 6, the mobile entity speed calculation unit 18 first specifies the coordinates at a point nearest to the host vehicle of the specified mobile entity (a point at the lower right or the lower left in the screen of the mobile entity), in the current frame and in a past frame that is one frame prior to the current frame, respectively. Note that the coordinates specified in the past frame that is one frame prior to the current frame are taken as start coordinates, and the coordinates specified in the current frame are taken as end coordinates. Also, the mobile entity speed calculation unit 18 can estimate the start coordinates from the average length and angle of the optical flows of the specified mobile entity. FIG. 6 illustrates processing to calculate the relative speed of the mobile entity according to an example embodiment of the present invention.

Next, as shown in FIG. 6, the mobile entity speed calculation unit 18 performs bird's-eye-view conversion using camera parameters of the imaging device 20 to convert the start coordinates and the end coordinates to coordinates in a real coordinate system. Also, the mobile entity speed calculation unit 18, from the coordinates after conversion, calculates the distance between the start coordinates and the end coordinates in real space, and adopts the calculated distance as the relative movement distance.

Then, the mobile entity speed calculation unit 18, based on the time from the past frame that is one frame prior to the current frame until the current frame, and the calculated relative movement distance, calculates the speed of the mobile entity with respect to the host vehicle. Note that the time from the past frame that is one frame prior to the current frame until the current frame can be calculated from the frame rate. For example, if the frame rate is 10 fps, the time is 0.1 seconds.

[Device Operation]

Figure 7:
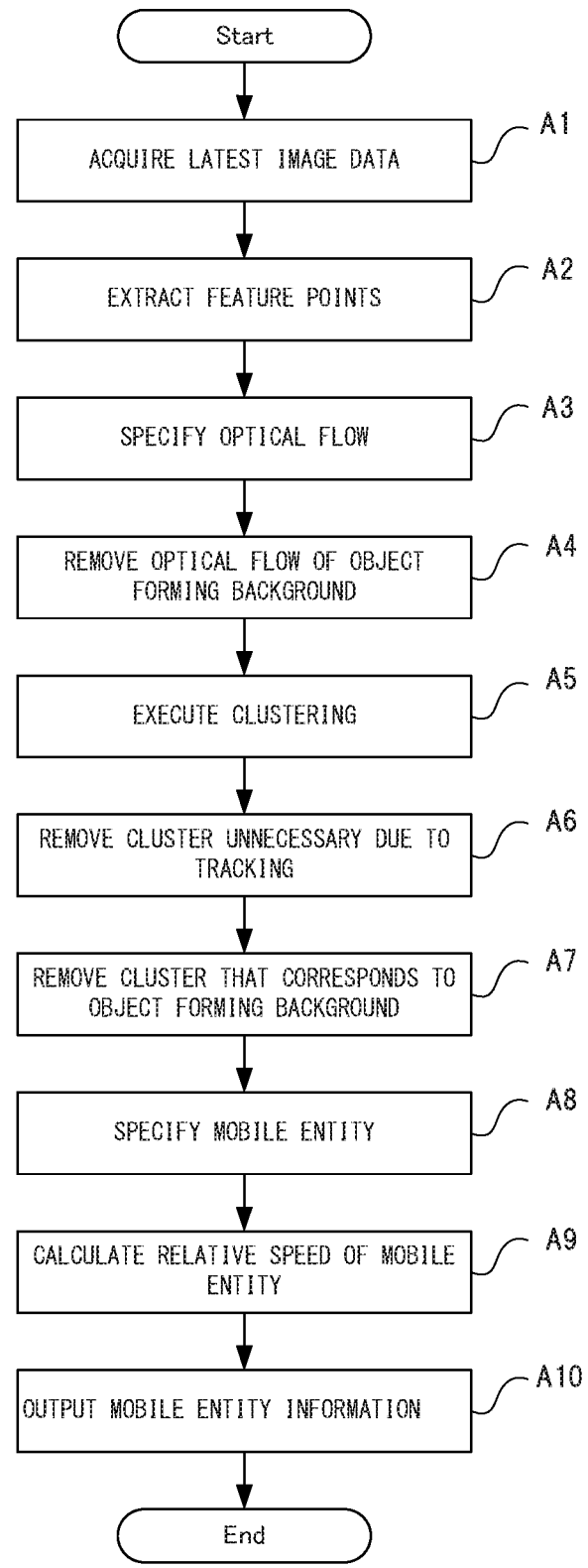
FIG. 7 is a flowchart showing operation of the mobile entity detection apparatus according to an example embodiment of the present invention.

Next, operation of the mobile entity detection apparatus 10 according to this example embodiment of the present invention will be described with reference to FIG. 7. FIG. 7 is a flowchart showing operation of the mobile entity detection apparatus according to this example embodiment of the present invention. The following description refers to FIGS. 1 to 6 as appropriate. Also, in this example embodiment, a mobile entity detection method is implemented by operating the mobile entity detection apparatus 10. Thus, the description of the mobile entity detection method in this example embodiment can be replaced with the description of operation of the mobile entity detection apparatus 10 below.

As shown in FIG. 7, first, the image acquisition unit 16 acquires image data output from the imaging device 20 for each frame (step A1).

Specifically, in step A1, the image acquisition unit 16 first performs conversion to a grayscale image, distortion correction, and the like on the acquired image data. Then, after the number of frames of acquired image data reaches a set number of frames, the image acquisition unit 16 transfers this image data to the feature point extraction unit 11.

Next, the feature point extraction unit 11 extracts feature points moving in an image from the image data acquired in step A1 (step A2).

Specifically, in step A2, the feature point extraction unit 11, using image data of a number of frames (for example, 10 frames) set in advance, calculates the unbiased variance of luminance change, and determines whether each pixel corresponds to a moving pixel or a stationary pixel. Then, the feature point extraction unit 11 extracts feature points from a movement area where a pixel determined to be a moving pixel was determined to exist.

Next, the optical flow specification unit 12 compares the latest image data with image data that was output further in the past, and specifies an optical flow for each feature point that was extracted (step A3).

Specifically, in step A3, as shown in FIG. 3, the optical flow specification unit 12 compares the feature points of a past frame that is one frame prior to the current frame with the feature points of the current frame, and links together feature points that correspond to each other, and connects together the feature points that were linked, thereby specifying an optical flow.

Next, the optical flow specification unit 12 removes an optical flow related to an object forming a background from the optical flows specified in step A3 based on the traveling direction and speed of the host vehicle (step A4).

Next, the clustering unit 13 performs clustering on all obtained optical flows based on the specified optical flows and the position of the specified optical flows in an image, and separates each optical flow into a cluster (step A5).

Specifically, as shown in FIG. 4, the clustering unit 13 first specifies the distance between the optical flows, and executes clustering based on the specified distance. Next, the clustering unit 13 removes, from a cluster, an optical flow whose length, position (coordinates in a screen), and direction deviate greatly from the average value of the optical flows in that cluster, and registers this optical flow in a newly generated cluster.

Next, the tracking unit 17 determines, for each cluster obtained by clustering, whether the position of each cluster overlaps a position predicted from image data other than the latest image data, and removes clusters that do not overlap as unnecessary clusters (step A6).

Next, continuing, based on the traveling direction and speed of the host vehicle, from among the clusters for which notification was given from the tracking unit 17, the filtering unit 14 specifies a cluster that corresponds to an object forming a background, and removes the specified cluster (step A7).

Next, the mobile entity specification unit 15 specifies a mobile entity based on a cluster other than the clusters that were removed in steps A6 and A7 (step A8).

Next, the mobile entity speed calculation unit 18, using the direction and length of the optical flows regarding the mobile entity specified by step A3, calculates the relative speed of the specified mobile entity with respect to the mobile entity detection apparatus 10 (the host vehicle)(step A9).

Afterward, when the speed of the mobile entity is calculated in step A9, the mobile entity specification unit 15 generates mobile entity information including that speed, and notifies the vehicle of the generated mobile entity information (step A10). Also, when step A10 is executed, the vehicle displays the mobile entity information in an instrument panel or the like, and performs collision detection processing, for example.

As described above, in this example embodiment, the mobile entity detection apparatus 10 detects a mobile entity by clustering optical flows of feature points, and removing a cluster that corresponds to a background from the obtained clusters. Therefore, according to this example embodiment, it is possible to improve the accuracy of mobile entity detection by distinguishing between a mobile entity and an object forming part of a background.

Also, in this example embodiment, tracking is performed by the tracking unit 17, so it is possible to respond to a situation where instantaneous false detection occurs. Furthermore, a cluster that was deleted by the tracking can be restored by the tracking unit 17 based on past frames, so it is also possible to respond to a situation where the mobile entity detection is interrupted for some reason.

[Program]

A program according to this example embodiment may be a program that causes a computer to execute steps A1 to A10 shown in FIG. 7. By installing this program in the computer and executing the program, the mobile entity detection apparatus 10 and the mobile entity detection method according to this example embodiment can be realized. In this case, a processor of the computer performs processing to function as the feature point extraction unit 11, the optical flow specification unit 12, the clustering unit 13, the filtering unit 14, the mobile entity specification unit 15, the image acquisition unit 16, the tracking unit 17, and the mobile entity speed calculation unit 18. Also, examples of the computer include a computer installed in a vehicle, a general-purpose computer, a computer installed in a portable information terminal, and the like.

Also, the program according to this example embodiment may be executed by a computer system constructed using a plurality of computers. In this case, for example, each computer may respectively function as any of the feature point extraction unit 11, the optical flow specification unit 12, the clustering unit 13, the filtering unit 14, the mobile entity specification unit 15, the image acquisition unit 16, the tracking unit 17, and the mobile entity speed calculation unit 18.

Figure 8:
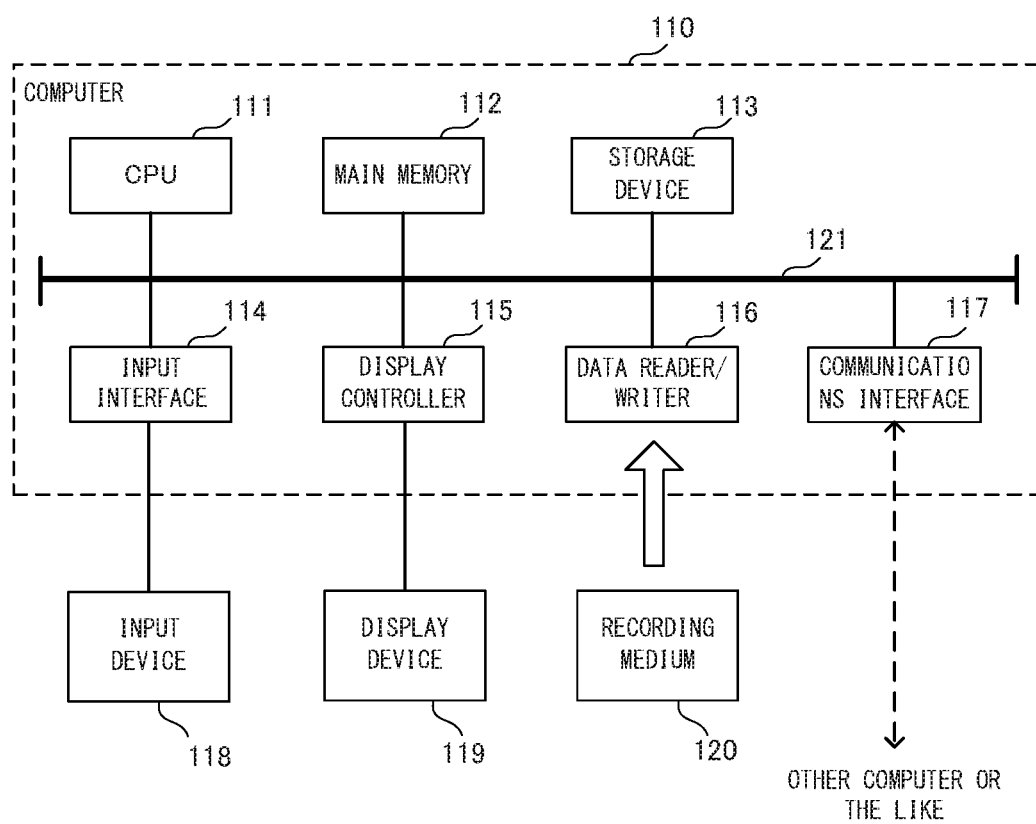
FIG. 8 is a block diagram showing an example of a computer that realizes the mobile entity detection apparatus according to an example embodiment of the present invention.

Here, an example of a computer that realizes the mobile entity detection apparatus 10 by executing the program according to this example embodiment will be described with reference to FIG. 8. FIG. 8 is a block diagram showing an example of a computer that realizes the mobile entity detection apparatus according to an example embodiment of the present invention.

As shown in FIG. 8, the computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may also include a GPU (Graphics Processing Unit) or an FPGA (Field-Programmable Gate Array) in addition to the CPU 111 or instead of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display by the display device 119. The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Note that the mobile entity detection apparatus 10 according to this example embodiment can be realized not only by a computer with a program installed, but also by using hardware corresponding to each part. Further, a configuration may be adopted in which a portion of the mobile entity detection apparatus 10 is realized by a program, and the remaining portions are realized by hardware.

Some portion or all of the example embodiments described above can be realized according to (supplementary note 1) to (supplementary note 15) described below, but the below description does not limit the present invention.

(Supplementary Note 1)

A mobile entity detection apparatus for detecting a mobile entity from image data output by an imaging device installed in a vehicle, the detection apparatus including:

a feature point extraction unit configured to extract, from image data successively output at a set interval by the imaging device, a feature point moving in an image;

an optical flow specification unit configured to compare the latest image data with image data that was output further in the past, and specify an optical flow for each feature point extracted;

a clustering unit configured to perform clustering on the optical flow based on the specified optical flow and the position of the specified optical flow in the image, and separate the optical flow into a cluster;

a filtering unit configured to remove a cluster that corresponds to an object forming a background from among clusters obtained by clustering, based on the traveling direction and speed of the vehicle; and a mobile entity specification unit configured to specify a mobile entity in the image using a result of clustering after cluster removal by the filtering unit.

(Supplementary Note 2)

The mobile entity detection apparatus according to supplementary note 1, further including:

a tracking unit configured to determine, for each cluster obtained by clustering, whether or not the position of each cluster overlaps a position predicted from image data other than the latest image data, wherein the mobile entity specification unit specifies the mobile entity in the image based on clusters determined to overlap.

(Supplementary Note 3)

The mobile entity detection apparatus according to supplementary note 1 or 2, further including:

a mobile entity speed calculation unit configured, using the direction and length of the optical flows regarding the specified mobile entity, to calculate the speed of the specified mobile entity with respect to the vehicle.

(Supplementary Note 4)

The mobile entity detection apparatus according to any of supplementary notes 1 to 3, wherein the clustering unit, in a case where, among a plurality of the clusters, the positional relationship between the plurality of clusters, and the length and direction of the respective optical flows of the clusters, satisfy set conditions, combines the plurality of clusters as a single cluster.

(Supplementary Note 5)

The mobile entity detection apparatus according to any of supplementary notes 1 to 4, wherein the optical flow specification unit removes an optical flow related to an object forming a background from among the specified optical flows based on the traveling direction and speed of the vehicle.

(Supplementary Note 6)

A mobile entity detection method for detecting a mobile entity from image data output by an imaging device installed in a vehicle, the method including:

(a) a step of extracting, from image data successively output at a set interval by the imaging device, a feature point moving in an image;

(b) a step of comparing the latest image data with image data that was output further in the past, and specifying an optical flow for each feature point extracted;

(c) a step of performing clustering on the optical flow based on the specified optical flow and the position of the specified optical flow in the image, and separating the optical flow into a cluster;

(d) a step of removing a cluster that corresponds to an object forming a background from among clusters obtained by clustering, based on the traveling direction and speed of the vehicle; and (e) a step of specifying a mobile entity in the image using a result of clustering after cluster removal by the (d) step.

(Supplementary Note 7)

The mobile entity detection method according to supplementary note 6, further including:

(f) a step of determining, for each cluster obtained by the (c) step, whether or not the position of each cluster overlaps a position predicted from image data other than the latest image data, wherein in the (e) step, the mobile entity in the image is specified based on clusters determined to overlap in the (f) step.

(Supplementary Note 8)

The mobile entity detection method according to supplementary note 6 or 7, further including:

(g) a step of using the direction and length of the optical flows regarding the mobile entity specified in the (e) step to calculate the speed of the specified mobile entity with respect to the vehicle.

(Supplementary Note 9)

The mobile entity detection method according to any of supplementary notes 6 to 8, wherein in the (c) step, in a case where, among a plurality of the clusters, the positional relationship between the plurality of clusters, and the length and direction of the respective optical flows of the clusters, satisfy set conditions, the plurality of clusters are combined as a single cluster.

(Supplementary Note 10)

The mobile entity detection method according to any of supplementary notes 6 to 9, further including:

(h) a step of, prior to executing the (c) step, removing an optical flow related to an object forming a background from among the optical flows specified in the (b) step based on the traveling direction and speed of the vehicle.

(Supplementary Note 11)

A computer-readable recording medium that includes a program recorded thereon for, with a computer, detecting a mobile entity from image data output by an imaging device installed in a vehicle, the program including instructions that cause the computer to carry out:

(a) a step of extracting, from image data successively output at a set interval by the imaging device, a feature point moving in an image;

(b) a step of comparing the latest image data with image data that was output further in the past, and specifying an optical flow for each feature point extracted;

(c) a step of performing clustering on the optical flow based on the specified optical flow and the position of the specified optical flow in the image, and separating the optical flow into a cluster;

(d) a step of removing a cluster that corresponds to an object forming a background from among clusters obtained by clustering, based on the traveling direction and speed of the vehicle; and (e) a step of specifying a mobile entity in the image using a result of clustering after cluster removal by the (d) step.

(Supplementary Note 12)

The computer-readable recording medium according to supplementary note 11, the program further including instructions that cause the computer to carry out:

(f) a step of determining, for each cluster obtained by the (c) step, whether or not the position of each cluster overlaps a position predicted from image data other than the latest image data, wherein in the (e) step, the mobile entity in the image is specified based on clusters determined to overlap in the (f) step.

(Supplementary Note 13)

The computer-readable recording medium according to supplementary note 11 or 12, the program further including instructions that cause the computer to carry out:

(g) a step of using the direction and length of the optical flows regarding the mobile entity specified in the (e) step to calculate the speed of the specified mobile entity with respect to the vehicle.

(Supplementary Note 14)

The computer-readable recording medium according to any of supplementary notes 11 to 13, wherein in the (c) step, in a case where, among a plurality of the clusters, the positional relationship between the plurality of clusters, and the length and direction of the respective optical flows of the clusters, satisfy set conditions, the plurality of clusters are combined as a single cluster.

(Supplementary Note 15)

The computer-readable recording medium according to any of supplementary notes 11 to 14, the program further including instructions that cause the computer to carry out:

(h) a step of, prior to executing the (c) step, removing an optical flow related to an object forming a background from among the optical flows specified in the (b) step based on the traveling direction and speed of the vehicle.

Although the present invention is described above with reference to example embodiments, the present invention is not limited by the above example embodiments. Within the scope of the present invention, various modifications understandable by those skilled in the art can be made to the configurations or details of the present invention.

INCORPORATION BY REFERENCE

This application is based upon and claims the benefit of priority from Japanese application No. 2017-037555, filed on Feb. 28, 2017, the disclosure of which is incorporated herein in its entirety by reference.

INDUSTRIAL APPLICABILITY

As described above, according to the present invention, it is possible to improve the accuracy of mobile entity detection by distinguishing between a mobile entity and an object forming a background. The present invention is useful in an information processing device of a vehicle where mobile entity detection is desired.

DESCRIPTION OF REFERENCE SIGNS

10 Mobile entity detection apparatus
11 Feature point extraction unit
12 Optical flow specification unit
13 Clustering unit
14 Filtering unit
15 Mobile entity specification unit
16 Image acquisition unit
17 Tracking unit
18 Mobile entity speed calculation unit
20 Imaging device
30 Host vehicle
31 Object fixed to the ground
32 Vehicle traveling in the opposite direction
110 Computer
111 CPU
112 Main memory
113 Storage device
114 Input interface
115 Display controller
116 Data reader/writer
117 Communications interface
118 Input device
119 Display device
120 Recording medium
121 Bus

The invention claimed is:

1. A mobile entity detection apparatus for detecting a mobile entity from image data output by an imaging device installed in a vehicle, the detection apparatus comprising:

a memory; and one or more processors, using the memory, configured to:

extract, from image data successively output at a set interval by the imaging device, a feature point moving in an image;

compare the latest image data with image data that was output further in the past, and specify an optical (low for each feature point extracted;

perform clustering on the optical flow based on the specified optical flow and the position of the specified optical flow in the image, and separate the optical flow into a cluster;

remove a cluster that corresponds to an object forming a background from among clusters obtained by clustering, based on the traveling direction and speed of the vehicle;

compare, for each cluster obtained by clustering, a position of each cluster to a position of each of a plurality of image data other than the latest image data and determine whether or not the position of each cluster matches in at least a fixed number of image data; and specify a mobile entity in the image using a result of clustering after cluster removal, based on clusters determined to match in at least the fixed number of image data.

2. The mobile entity detection apparatus according to claim 1 wherein the one or more processors is further configured to:

using the direction and length of the optical flows regarding the specified mobile entity, calculate the speed of the specified mobile entity with respect to the vehicle.

3. The mobile entity detection apparatus according to claim 1, wherein the one or more processors is further configured to:

in a case where, among a plurality of the clusters, the positional relationship between the plurality of clusters, and the length and direction of the respective optical flows of the clusters, satisfy set conditions, combine the plurality of clusters as a single cluster.

4. The mobile entity detection apparatus according to claim 1, wherein the one or more processors is further configured to:

remove an optical flow related to an object forming a background from among the specified optical flows based on the traveling direction and speed of the vehicle.

5. A mobile entity detection method for detecting a mobile entity from image data output by an imaging device installed in a vehicle, the method comprising:
(a) extracting, from image data successively output at a set interval by the imaging device, a feature point moving in an image;
(b) comparing the latest image data with image data that was output further in the past, and specifying an optical flow for each feature point extracted;
(c) performing clustering on the optical flow based on the specified optical flow and the position of the specified optical flow in the image, and separating the optical flow into a cluster;
(d) removing a cluster that corresponds to an object forming a background from among clusters obtained by clustering, based on the traveling direction and speed of the vehicle;
(e) comparing, for each cluster obtained by clustering, a position of each cluster to a position of each of a plurality of image data other than the latest image data and determine whether or not the position of each cluster matches in at least a fixed number of image data; and
(f) specifying a mobile entity in the image using a result of clustering after cluster removal by the (d), based on clusters determined to match in at least the fixed number of image data.

6. The mobile entity detection method according to claim 5, further comprising:
(g) determining, for each cluster obtained by the (c), whether or not the position of each cluster overlaps a position predicted from image data other than the latest image data,
wherein in the (f), the mobile entity in the image is specified based on clusters determined to overlap in the (g).

7. The mobile entity detection method according to claim 5, further comprising:
(h) using the direction and length of the optical flows regarding the mobile entity specified in the (f) to calculate the speed of the specified mobile entity with respect to the vehicle.

8. The mobile entity detection method according to claim 5,
wherein in the (c), in a case where, among a plurality of the clusters, the positional relationship between the plurality of clusters, and the length and direction of the respective optical flows of the clusters, satisfy set conditions, the plurality of clusters are combined as a single cluster.

9. The mobile entity detection method according to claim 5, further comprising:
(i) prior to executing the (c), removing an optical flow related to an object forming a background from among the optical flows specified in the (b) based on the traveling direction and speed of the vehicle.

10. A non-transitory computer-readable recording medium that includes a program recorded thereon for, with a computer, detecting a mobile entity from image data output by an imaging device installed in a vehicle, the program including instructions that cause the computer to carry out:
(a) extracting, from image data successively output at a set interval by the imaging device, a feature point moving in an image;
(b) comparing the latest image data with image data that was output further in the past, and specifying an optical flow for each feature point extracted;
(c) performing clustering on the optical flow based on the specified optical flow and the position of the specified optical flow in the image, and separating the optical flow into a cluster;
(d) removing a cluster that corresponds to an object forming a background from among clusters obtained by clustering, based on the traveling direction and speed of the vehicle; and
(e) comparing, for each cluster obtained by clustering, a position of each cluster to a position of each of a plurality of image data other than the latest image data and determine whether or not the position of each cluster matches in at least a fixed number of image data; and
(f) specifying a mobile entity in the image using a result of clustering after cluster removal by the (d) based on clusters determined to match in at least the fixed number of image data.

11. The non-transitory computer-readable recording medium according to claim 10, the program further including instructions that cause the computer to carry out:
(g) determining, for each cluster obtained by the (c), whether or not the position of each cluster overlaps a position predicted from image data other than the latest image data,
wherein in the (f), the mobile entity in the image is specified based on clusters determined to overlap in the (g).

12. The non-transitory computer-readable recording medium according to claim 10, the program further including instructions that cause the computer to carry out:
(h) using the direction and length of the optical flows regarding the mobile entity specified in the (f) to calculate the speed of the specified mobile entity with respect to the vehicle.

13. The non-transitory computer-readable recording medium according to claim 10, wherein in the (c), in a case where, among a plurality of the clusters, the positional relationship between the plurality of clusters, and the length and direction of the respective optical flows of the dusters, satisfy set conditions, the plurality of clusters are combined as a single cluster.

14. The non-transitory computer-readable recording medium according to claim 10, the program further including instructions that cause the computer to carry out:
(i) prior to executing the (c), removing an optical flow related to an object forming a background from among the optical flows specified in the (b) based on the traveling direction and speed of the vehicle.

* * * * *